June 19, 1928. 1,674,041

O. HENKER

OBJECTIVE REVOLVING NOSE PIECE FOR MICROSCOPES

Filed March 24, 1925

Inventor:
Otto Henker
by Walther Bauersfeld.

Patented June 19, 1928.

UNITED STATES PATENT OFFICE.

OTTO HENKER, OF JENA, GERMANY, ASSIGNOR TO THE FIRM CARL ZEISS, OF JENA, GERMANY.

OBJECTIVE-REVOLVING NOSE PIECE FOR MICROSCOPES.

Application filed March 24, 1925, Serial No. 17,919½, and in Germany March 29, 1924.

In low power binocular microscopes fitted with two tubes it is, as is well known, of importance that the two objectives, simultaneously used on these tubes at any one time, are exactly adjusted for each other, so that the observer, when looking into the two oculars with his eyes adjusted to a large distance, will obtain plastic images of the object observed. Hence, the above mentioned microscopes are generally provided with a guide, overlapping both tube ends, into which slides may be inserted. To each magnification required appertains such a slide on which there are fixed one pair each of objectives of a certain definitive magnifying power, adjusted for one focal plane and also relatively to their optical axes, and by means of exchanging the slides with pairs of objectives of different magnifying power it is possible to attain a change of the magnifying power of the microscope. The operation of such binocular microscopes corresponds therefore to that of monocular microscopes provided with sliding objective changers.

It is well known that the amount of time required for operating the sliding objective changers is greater than that which is necessary for changing the magnification by means of an objective-revolving nosepiece, and it is obvious to also strive for this economy of time, afforded by the use of the revolving nosepiece, when using a binocular microscope. It has therefore been attempted to provide the two microscope tubes with a revolving nosepiece each as carriers of one each of the objectives of the various pairs of objectives, so that, when changing the magnification, it proved necessary to insert two objectives appertaining to each other into the path of rays. This solution of the problem has, however, the disadvantage that the objectives, after having repeatedly been inserted and removed, may show very objectionable deflections of their optical axes from the adjusted position of the same, which deflections render impossible an exact working with the microscope.

The invention discloses a solution of the present problem in which the cited disadvantages have been avoided, viz. by constructing a revolving nosepiece for binocular microscopes in such a way that the same will be capable of receiving two or several paired objectives. The latter may be firmly adjusted for each other and also when changing the magnification, in which case only paired objectives are interchanged, the adjustment cannot be impaired.

Figure 1:
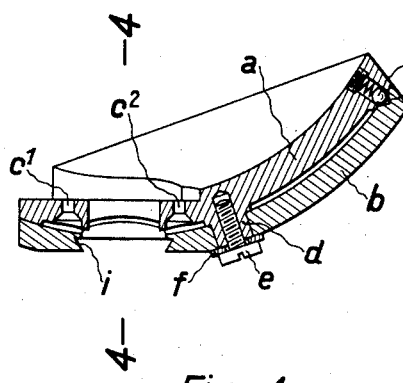
Figure 3:
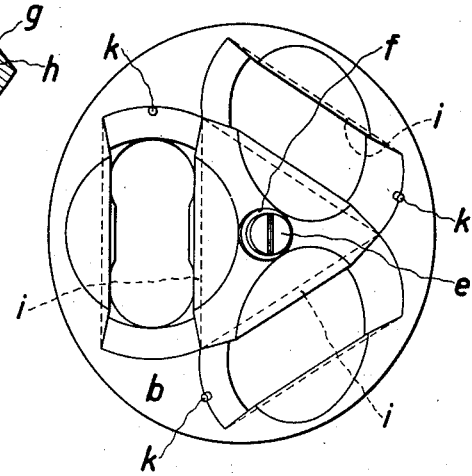
Figure 2:
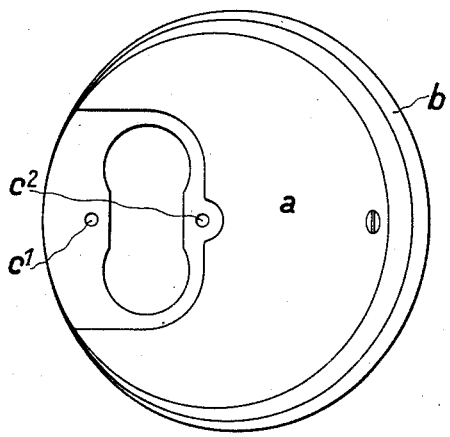
Figure 4:
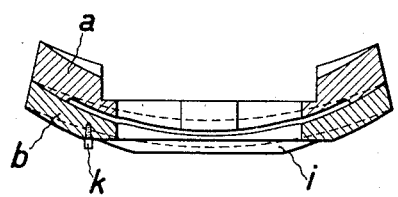

The annexed drawing shows as a constructional example of the invention a revolving nosepiece destined for three pairs of objectives. Fig. 1 is a cross section, Fig. 2 is a top view, Fig. 3 is a view from below and Fig. 4 is a section on the line 4—4 of Fig. 1.

The revolving nosepiece consisting of two spherical bowls $a$ and $b$ has two bores $c^1$ and $c^2$ for the reception of two screws which serve for fixing the revolving nosepiece on the microscope. The spherical bowl $b$ is rotatable about a pivot $d$ of the spherical bowl $a$ and proof against being removed by means of a screw $e$ and a washer $f$. To a ball $g$, provided in the spherical bowl $a$ and being under spring tension, appertain three notches $h$ of the spherical bowl $b$ for securing the relative position of both spherical bowls in their operative positions. The spherical bowl $b$ is provided with three prismatic excavations $i$, displaced by 120° each and destined for the reception of three pairs of objectives mounted on slides. In order to secure the position of each of these slides a stop $k$ is provided for each slide.

The operation of the revolving nosepiece takes place in the same way as that of an objective-revolving nosepiece on a monocular microscope. However, instead of the single objectives to be screwed into the latter microscope it is necessary in the present case to use paired objectives mounted on slides. The paired objectives are adjusted in their slides and the latter inserted for use into the guides $i$ of the revolving nosepiece as far as the stop $k$.

I claim:

Objective-revolving nosepiece for binocular microscopes with paired objectives consisting of a body, means provided on this body for fixing it on the binocular tube of the microscope, the said body having a longitudinal slot allowing the light to enter the binocular tube, of a second body, rotatably supported on the said first body, and of fastening means provided on this second body, for receiving a plurality of slides provided each with a pair of objectives.

OTTO HENKER.